United States Patent
Shimizu et al.

(10) Patent No.: US 8,974,347 B2
(45) Date of Patent: Mar. 10, 2015

(54) FLUID PRESSURE CONTROL DEVICE FOR AUTOMATIC TRANSMISSION

(75) Inventors: Tetsuya Shimizu, Anjo (JP); Kenichi Tsuchida, Nishio (JP); Satoshi Nishio, Kota (JP); Kazuki Kojima, Kariya (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 162 days.

(21) Appl. No.: 13/534,953

(22) Filed: Jun. 27, 2012

(65) Prior Publication Data

US 2013/0012354 A1     Jan. 10, 2013

(30) Foreign Application Priority Data

Jul. 5, 2011 (JP) ................. 2011-149534

(51) Int. Cl.
    *F16H 59/24*     (2006.01)
    *F16H 47/08*     (2006.01)

(52) U.S. Cl.
    USPC ..................... 477/164; 475/137; 417/416

(58) Field of Classification Search
    USPC .......... 475/136, 137; 477/156, 157, 158, 163, 477/164; 417/15, 415, 416, 417
    See application file for complete search history.

(56) References Cited

U.S. PATENT DOCUMENTS

| | | | |
|---|---|---|---|
| 7,578,761 B2 * | 8/2009 | Nishikawa et al. | 475/127 |
| 2005/0064975 A1 * | 3/2005 | Takagi et al. | 475/101 |
| 2010/0028168 A1 | 2/2010 | Shimizu et al. | |
| 2010/0193313 A1 * | 8/2010 | Shimizu et al. | 192/3.3 |
| 2010/0203989 A1 * | 8/2010 | Shirasaka et al. | 474/28 |
| 2011/0088990 A1 | 4/2011 | Shimizu et al. | |
| 2011/0293449 A1 * | 12/2011 | Shimizu et al. | 417/415 |

FOREIGN PATENT DOCUMENTS

| | | |
|---|---|---|
| JP | A-2000-170894 | 6/2000 |
| JP | A-2009-287682 | 12/2009 |
| JP | A-2010-121741 | 6/2010 |
| WO | WO 2010/013556 A1 | 2/2010 |

OTHER PUBLICATIONS

Jul. 24, 2012 International Search Report issued in PCT/JP2012/065089 (with partial translation).

* cited by examiner

*Primary Examiner* — Roger Pang
(74) *Attorney, Agent, or Firm* — Oliff PLC

(57) ABSTRACT

A fluid pressure control device for an automatic transmission that transfers power from a motor via a friction engagement element, including: a first pump actuated by the power from the motor; a pressure regulator that regulates pressure of a working fluid pumped from the first pump; a first flow passage connected to an output port of the pressure regulator; a second flow passage connected to a fluid pressure chamber of the friction engagement element; a switcher that establishes and blocks connection between the first flow passage and the second flow passage; a second pump actuated by supply of electric power and capable of supplying the working fluid to the second flow passage with connection between the first flow passage and the second flow passage blocked by the switcher; and a pressure accumulator that accumulates pressure of the working fluid. The pressure accumulator is connected to the first flow passage.

5 Claims, 3 Drawing Sheets

F I G . 1
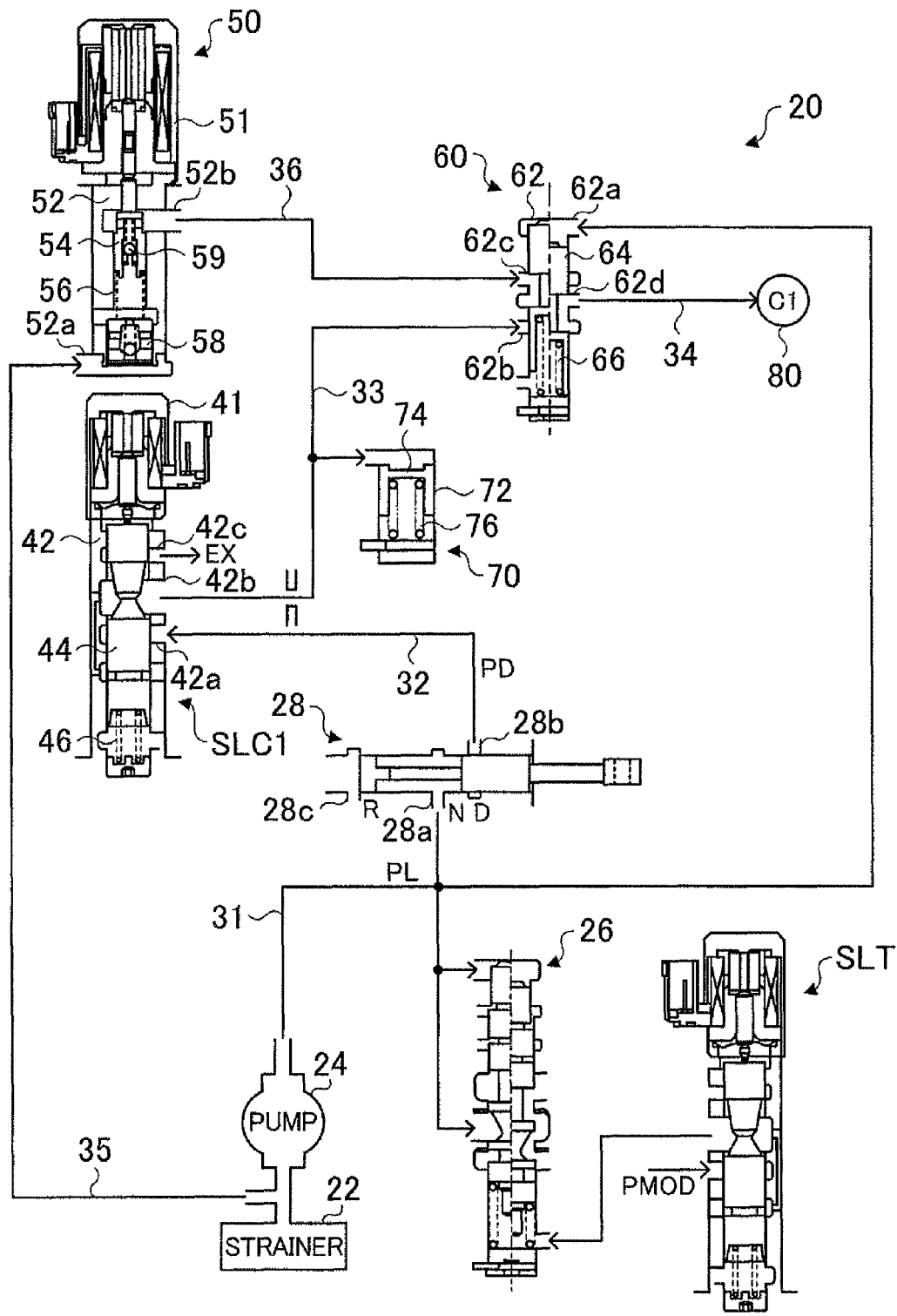

FLUID PRESSURE CONTROL DEVICE FOR AUTOMATIC TRANSMISSION

INCORPORATION BY REFERENCE

The disclosure of Japanese Patent Application No. 2011-149534 filed on Jul. 5, 2011 including the specification, drawings and abstract is incorporated herein by reference in its entirety.

BACKGROUND OF THE INVENTION

The present invention relates to a fluid pressure control device for an automatic transmission that transfers power from a motor via a friction engagement element.

DESCRIPTION OF THE RELATED ART

Hitherto, there has been proposed a fluid pressure control device for an automatic transmission including a mechanical oil pump actuated by power from an engine, an electromagnetic valve that regulates the pressure of working oil pumped from the mechanical oil pump to output the working oil, an electromagnetic pump (pump portion) integrally incorporated in the electromagnetic valve to intermittently drive an electromagnetic portion of the electromagnetic valve to discharge the working oil, an output port oil passage connected to an output port of the electromagnetic valve, a discharge port oil passage connected to a discharge port of the electromagnetic pump, a clutch oil passage connected to a clutch chamber of a clutch, a switching valve that selectively establishes connection between the output port oil passage and the clutch oil passage and the discharge port oil passage and the clutch oil passage, and an accumulator connected to the clutch oil passage (see Japanese Patent Application Publication No. 2010-121741 (JP 2010-121741 A), for example). In the device, when the engine is in operation, the switching valve establishes connection between the output port oil passage and the clutch oil passage and blocks connection between the discharge port oil passage and the clutch oil passage to supply working oil from the electromagnetic valve to the clutch chamber via the switching valve. When the engine is not in operation, on the other hand, the switching valve blocks connection between the output port oil passage and the clutch oil passage, establishes connection between the discharge port oil passage and the clutch oil passage, and drives the electromagnetic pump to supply working oil from the electromagnetic pump to the clutch chamber.

SUMMARY OF THE INVENTION

In the device discussed above, the accumulator is connected to the clutch oil passage, and functions effectively when working oil from the mechanical oil pump is supplied to the clutch oil passage via the electromagnetic valve and the switching valve. When working oil from the electromagnetic pump, rather than from the mechanical oil pump, is supplied to the clutch oil passage, however, a sufficient hydraulic pressure may not be applied to the clutch chamber because of leakage of working oil from the sliding surface of a piston of the accumulator, because the electromagnetic pump is generally significantly low in pumping performance compared to the mechanical oil pump. In this case, it is necessary to design the electromagnetic pump in consideration of leakage of working oil from the accumulator, which may incur an increase in size of the electromagnetic pump.

A main object of a fluid pressure control device for an automatic transmission according to the present invention is to suppress leakage of a working fluid pumped from an electromagnetic pump.

In order to achieve the foregoing main object, the fluid pressure control device for an automatic transmission according to the present invention adopts the following means.

The present invention provides a fluid pressure control device for an automatic transmission that transfers power from a motor via a friction engagement element. The fluid pressure control device includes: a first pump actuated by the power from the motor; a pressure regulator that regulates a pressure of a working fluid pumped from the first pump to output the working fluid; a first flow passage connected to an output port of the pressure regulator; a second flow passage connected to a fluid pressure chamber of the friction engagement element; a switcher that switchably establishes and blocks connection between the first flow passage and the second flow passage; a second pump actuated by supply of electric power and capable of supplying the working fluid to the second flow passage with connection between the first flow passage and the second flow passage blocked by the switcher; and a pressure accumulator that accumulates the pressure of the working fluid, and the pressure accumulator is connected to the first flow passage.

The fluid pressure control device for an automatic transmission according to the present invention includes: the first pump actuated by the power from the motor; the pressure regulator that regulates the pressure of the working fluid pumped from the first pump to output the working fluid; the first flow passage connected to the output port of the pressure regulator; the second flow passage connected to the fluid pressure chamber of the friction engagement element; the switcher that switchably establishes and blocks connection between the first flow passage and the second flow passage; the second pump actuated by supply of electric power and capable of supplying the working fluid to the second flow passage with connection between the first flow passage and the second flow passage blocked by the switcher; and the pressure accumulator that accumulates the pressure of the working fluid, and the pressure accumulator is connected to the first flow passage. This allows the working fluid from the pressure regulator to be supplied to the fluid pressure chamber of the friction engagement element while causing the pressure accumulator to demonstrate its function when connection between the first flow passage and the second flow passage is established by the switcher. When connection between the first flow passage and the second flow passage is blocked by the switcher, meanwhile, the pressure accumulator is disconnected from the second flow passage by the switcher, which makes it possible to supply a necessary amount of working fluid to be supplied to the fluid pressure chamber of the friction engagement element without leakage from the pressure accumulator of the working fluid supplied from the second pump to the second flow passage. As a result, the size of the second pump can be reduced by setting the second pump so as to provide necessary and sufficient pumping performance.

The thus configured fluid pressure control device for an automatic transmission according to the present invention may further include a third flow passage connected to a discharge port of the second pump, and the switcher may selectively switch connection between the first flow passage and the second flow passage and connection between the third flow passage and the second flow passage.

In the fluid pressure control device for an automatic transmission according to the present invention, the switcher may be a switching valve that switchably establishes and blocks connection between the flow passages along with sliding of a spool, and the pressure accumulator may accumulate the pressure of the working fluid along with sliding of a piston, and the pressure accumulator may be formed to have a sliding surface diameter larger than that of the switcher. In this way, leakage of the working fluid pumped from the second pump can be more remarkably reduced by connecting the pressure accumulator to the second flow passage.

In the fluid pressure control device for an automatic transmission according to the present invention, further, the second pump may be an electromagnetic pump. The fluid pressure control device for an automatic transmission according to the present invention may further include an electromagnetic valve which includes a hollow sleeve formed with various ports including an input port and an output port, a spool that is moved in the sleeve to establish and block communication between the predetermined ports, and an electromagnetic portion that moves the spool using an electromagnetic force. The electromagnetic valve may be configured to function also as a pump that pumps the working fluid by intermittently driving the electromagnetic portion with a part of the sleeve formed as a cylinder and with a part of the spool formed as a piston, and the second pump may be the electromagnetic valve.

BRIEF DESCRIPTION OF THE DRAWINGS

FIG. 1 is a diagram showing a schematic configuration of a fluid pressure control device 20 for an automatic transmission according to an embodiment of the present invention;

DETAILED DESCRIPTION OF THE EMBODIMENTS

Figure 2:
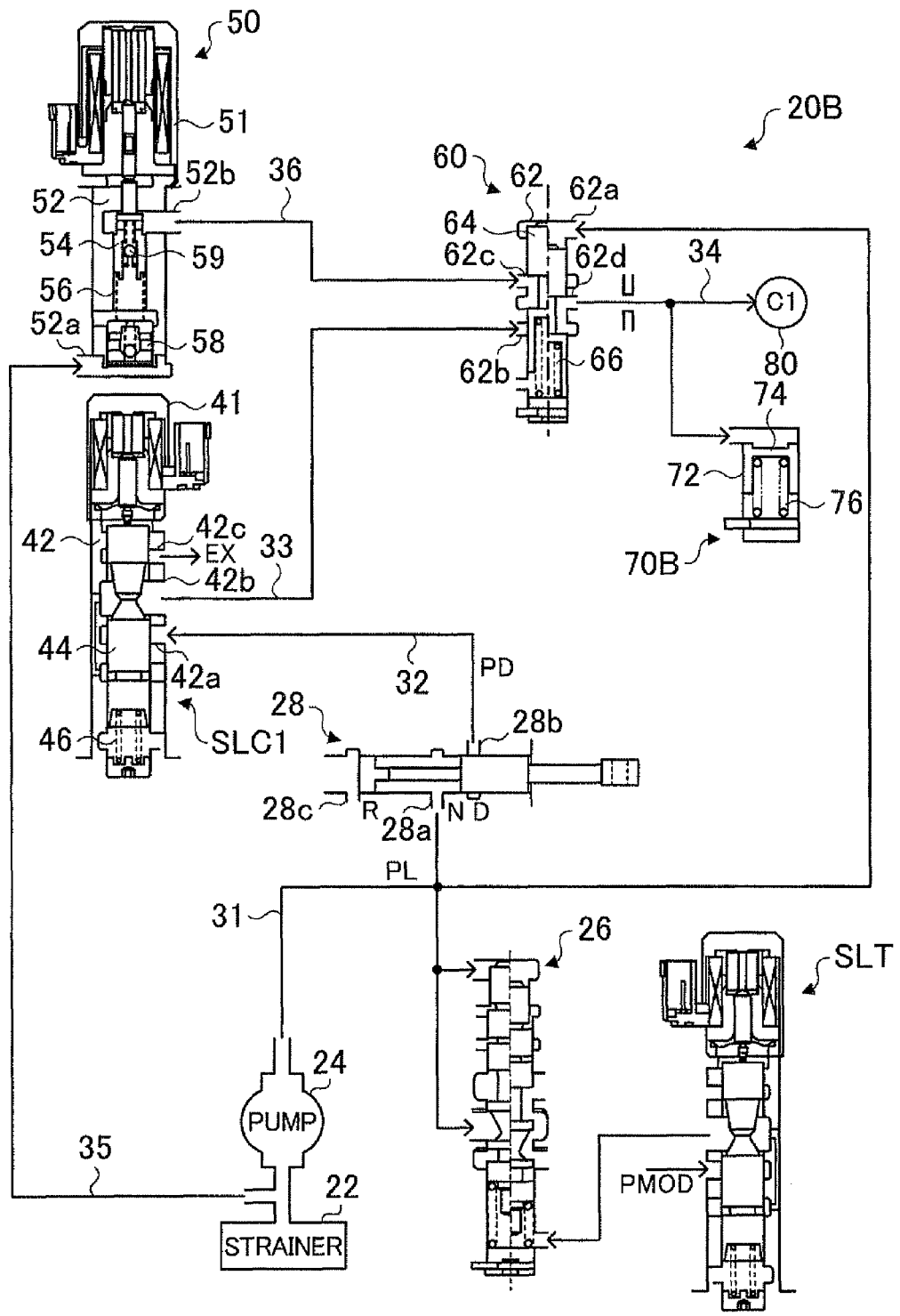
FIG. 2 is a diagram showing a schematic configuration of a hydraulic circuit 20B according to a comparative example.

An embodiment of the present invention will be described below.

FIG. 1 is a diagram showing a schematic configuration of a fluid pressure control device 20 for an automatic transmission according to an embodiment of the present invention. The fluid pressure control device 20 for an automatic transmission according to the embodiment is formed as a device that is mounted on a vehicle including an engine as an internal combustion engine and a stepped automatic transmission that outputs power from the engine to the axle side with the speed of the power changed to control a plurality of hydraulically driven clutches (including brakes) of the automatic transmission.

As shown in the drawing, the fluid pressure control device 20 for an automatic transmission according to the embodiment includes: a mechanical oil pump 24 that sucks and pumps working oil reserved in an oil pan (not shown) via a strainer 22 using power from the engine; a regulator valve 26 that regulates the pressure (line pressure PL) of the working oil pumped from the mechanical oil pump 24; a linear solenoid valve SLT that drives the regulator valve 26 by regulating a modulator pressure PMOD generated via a modulator valve (not shown) from the line pressure PL to output the modulator pressure PMOD as a signal pressure; a manual valve 28 formed with an input port 28a to which the line pressure PL is input, a D (drive)-position output port 28b, an R (reverse)-position output port 28c, and so forth to establish and block communication between the predetermined ports in conjunction with an operation of a shift lever (not shown); a linear solenoid valve SLC1 that regulates the hydraulic pressure from the D-position port 28b of the manual valve 28 to output the regulated pressure to a hydraulic pressure chamber (clutch hydraulic pressure chamber 80) of a clutch C1 corresponding to the linear solenoid valve SLC1; an electromagnetic pump 50 that sucks working oil from the oil pan via the strainer 22 to discharge the working oil; a switching valve 60 that selectively supplies an output pressure (SLC1 pressure) from the linear solenoid valve SLC1 and a discharge pressure from the electromagnetic pump 50 to the clutch hydraulic pressure chamber 80; and an accumulator 70 that functions as a damper that suppresses pulsation of the hydraulic pressure from the linear solenoid valve SLC1. The mechanical oil pump 24 is connected to the regulator valve 26, the input port 28a of the manual valve 28, and the switching valve 60 via the line pressure oil passage 31. In FIG. 1, only a hydraulic system that drives the clutch C1, of the plurality of clutches of the automatic transmission, is shown. However, hydraulic systems that drive other clutches and brakes may be configured similarly using known linear solenoid valves etc. In the embodiment, the clutch C1 is formed as a clutch that establishes a shift speed for starting.

The linear solenoid valve SLC1 includes: an electromagnetic portion 41 that generates an electromagnetic force along with energization of a coil; a hollow cylindrical sleeve 42 formed with various ports including an input port 42a, an output port 42b, and a drain port 42c; a columnar spool 44 pressed by the electromagnetic force from the electromagnetic portion 41 to slide in the sleeve 42 to establish and block communication between the predetermined ports; and a spring 46 that urges the spool 44 in the direction opposite to the pressing direction of the electromagnetic force. The linear solenoid valve SLC1 is formed as a linear solenoid valve that generates from the line pressure PL a hydraulic pressure necessary to engage the clutch C1 to directly control the clutch C1. The input port 42a of the linear solenoid valve SLC1 is connected to the D-position port 28b of the manual valve 28 via an input port oil passage 32. The output port 42b of the linear solenoid valve SLC1 is connected to an input port 62b of the switching valve 60 via an output port oil passage 33.

The electromagnetic pump 50 includes: an electromagnetic portion 51 that generates an electromagnetic force along with energization of a coil; a hollow cylindrical cylinder 52 formed with an suction port 52a and a discharge port 52b; a columnar piston 54 pressed by the electromagnetic force from the electromagnetic portion 51 to slide in the cylinder 52; a spring 56 that urges the piston 54 in the direction opposite to the pressing direction of the electromagnetic force; a suction check valve 58 built in the cylinder 52 to allow working oil from the suction port 52a to flow in and prohibits working oil to flow out in the opposite direction; and a discharge check valve 59 built in the piston 54 to allow working oil to flow out to the discharge port 52b and prohibits working oil to flow in the opposite direction. The electromagnetic pump 50 pumps working oil by causing the piston 54 to reciprocate by intermittently energizing the coil. The suction port 52a of the electromagnetic pump 50 is connected to the strainer 22 via a suction port oil passage 35. The discharge port 52b of the electromagnetic pump 50 is connected to an input port 62c of the switching valve 60 via a discharge port oil passage 36.

The switching valve 60 includes: a hollow cylindrical sleeve 62 formed with a signal pressure port 62a, the two input ports 62*b* and 62*c*, and an output port 62*d*; a columnar spool 64 that slides in the sleeve 62 to establish and block communication between the predetermined ports; and a spring 66 that urges the spool 64. The signal pressure port 62*a* is a port to which a signal pressure that presses the spool 64 in the direction opposite to the urging direction of the spring 66 is introduced. In the embodiment, the signal pressure port 62*a* is connected to the line pressure oil passage 31 so that the line pressure PL is introduced to the signal pressure port 62*a*. The input port 62*b* is connected to the output port oil passage 33 from the linear solenoid valve SLC1. The input port 62*c* is connected to the discharge port oil passage 36 from the electromagnetic pump 50. The output port 62*d* is connected to the clutch hydraulic pressure chamber 80 via a clutch oil passage 34. In the switching valve 60, when the line pressure PL is introduced to the signal pressure port 62*a*, the spool 64 is moved to a position indicated on the right half in the drawing to establish communication between the input port 62*b* and the output port 62*d* and block communication between the input port 62*c* and the output port 62*d*. When the line pressure PL is not introduced to the signal pressure port 62*a*, the spool 64 is moved to a position indicated on the left half in the drawing to block communication between the input port 62*b* and the output port 62*d* and establish communication between the input port 62*c* and the output port 62*d*. In the embodiment, the spool 64 of the switching valve 60 has a diameter of 8 mm to 10 mm.

The accumulator 70 is formed as a piston-type accumulator including a hollow cylindrical cylinder 72, a columnar piston 74 that slides in the cylinder 72, and a spring 76 that presses the piston 74. The accumulator 70 is connected to the output port oil passage 33 between the linear solenoid valve SLC1 and the switching valve 60. In the embodiment, the piston 74 of the accumulator 70 has a diameter of 15 mm to 20 mm, which is larger than the diameter of the spool 64 of the switching valve 60.

In the vehicle incorporating the fluid pressure control device 20 for an automatic transmission according to the embodiment, if automatic stop conditions set in advance, such as a vehicle speed V having a value of 0, the accelerator being off, the brake being on, and the engine kept idling over a predetermined period of time, are all established when the shift lever is in the D (drive) position, the engine is automatically stopped. After the engine is automatically stopped, the engine which has been automatically stopped is automatically started when automatic start conditions set in advance, such as the brake being off, are established. When the engine is automatically stopped, the mechanical oil pump 24 is de-actuated, and the switching valve 60 blocks communication between the output port oil passage 33 and the clutch oil passage 34 and establishes communication between the discharge port oil passage 36 and the clutch oil passage 34. Thus, a hydraulic pressure can be applied to the clutch hydraulic pressure chamber 80 via the clutch oil passage 34 by driving the electromagnetic pump 50 to discharge working oil to the discharge port oil passage 36. In the embodiment, the electromagnetic pump 50 is driven such that a hydraulic pressure necessary to hold a piston of the clutch C1 around its stroke end is applied to the clutch hydraulic pressure chamber 80. After that, when the engine is automatically started, the mechanical oil pump 24 is actuated, and the switching valve 60 is driven by the line pressure PL to establish communication between the output port oil passage 33 and the clutch oil passage 34 and block communication between the discharge port oil passage 36 and the clutch oil passage 34. Thus, the SLC1 pressure can be applied to the clutch hydraulic pressure chamber 80 via the clutch oil passage 34 by outputting working oil pumped from the mechanical oil pump 24 to the output port oil passage 33 via the linear solenoid valve SLC1, which allows the clutch C1 to be engaged using the SLC1 pressure. By driving the electromagnetic pump 50 with the engine automatically stopped to establish a stand-by state in which a hydraulic pressure (stroke end pressure) is applied to the clutch hydraulic pressure chamber 80, the clutch C1 can be quickly engaged immediately after the engine is automatically started, which allows the vehicle to start moving smoothly.

Here, in the case where the mechanical oil pump 24 is actuated and the switching valve 60 establishes communication between the output port oil passage 33 and the clutch oil passage 34 and blocks communication between the discharge port oil passage 36 and the clutch oil passage 34, the accumulator 70 is connected to the output port oil passage 33, and thus pulsation of the SLC1 pressure from the linear solenoid valve SLC1 is suppressed by the accumulator 70. On the other hand, in the case where the mechanical oil pump 24 is stopped and the switching valve 60 blocks communication between the output port oil passage 33 and the clutch oil passage 34 and establishes communication between the discharge port oil passage 36 and the clutch oil passage 34, the output port oil passage 33 to which the accumulator 70 is connected is disconnected from the clutch oil passage 34 by the switching valve 60, and thus the accumulator 70 is not connected to a path leading from the discharge port 52*b* of the electromagnetic pump 50 to the clutch hydraulic pressure chamber 80 (the discharge port oil passage 36, the switching valve 60, and the clutch oil passage 34). This is because the accumulator 70 is formed as a piston-type accumulator in which slight working oil leaks from the sliding surface between the cylinder 72 and the piston 74, and the electromagnetic pump 50 is significantly low in pumping performance compared to the mechanical oil pump 24. Thus, a sufficient hydraulic pressure may not be applied to the clutch hydraulic pressure chamber 80 by connecting an accumulator 70B to the clutch oil passage 34 as shown in a hydraulic circuit 20B according to a comparative example in FIG. 2, for example, due to leakage of working oil, which is discharged from the electromagnetic pump 50, from the accumulator 70B.

In the fluid pressure control device 20 for an automatic transmission according to the embodiment described above, the switching valve 60 is provided to selectively switch communication between the output port oil passage 33 connected to the output port 42*b* of the linear solenoid valve SLC1 and the clutch oil passage 34 connected to the clutch hydraulic pressure chamber 80 and communication between the discharge port oil passage 36 connected to the discharge port 52*b* of the electromagnetic pump 50 and the clutch oil passage 34, and the accumulator 70 which functions as a damper is connected to the output port oil passage 33. Thus, it is possible to have the accumulator 70 not connected to the path leading from the discharge port 52*b* of the electromagnetic pump 50 to the clutch hydraulic pressure chamber 80 (the discharge port oil passage 36, the switching valve 60, and the clutch oil passage 34), and to suppress leakage of working oil when a hydraulic pressure is applied from the electromagnetic pump 50 to the clutch hydraulic pressure chamber 80. As a result, the size of the electromagnetic pump 50 can be reduced by designing the electromagnetic pump 50 so as to provide necessary and sufficient pumping performance. In addition, the piston 74 of the accumulator 70 is set to be larger in diameter than the spool 64 of the switching valve 60, and thus the amount of working oil leaking from the accumulator 70 is larger than that of the switching valve 60. Therefore, the effect obtained by not providing the accumulator 70 in the path leading from the discharge port 52b of the electromagnetic pump 50 to the clutch hydraulic pressure chamber 80 can be made more remarkable. When the SLC1 pressure from the linear solenoid valve SLC1 is supplied to the clutch hydraulic pressure chamber 80 via the output port oil passage 33 and the clutch oil passage 34, pulsation of the SLC1 pressure can be suppressed by the accumulator 70 connected to the output port oil passage 33.

Figure 3:
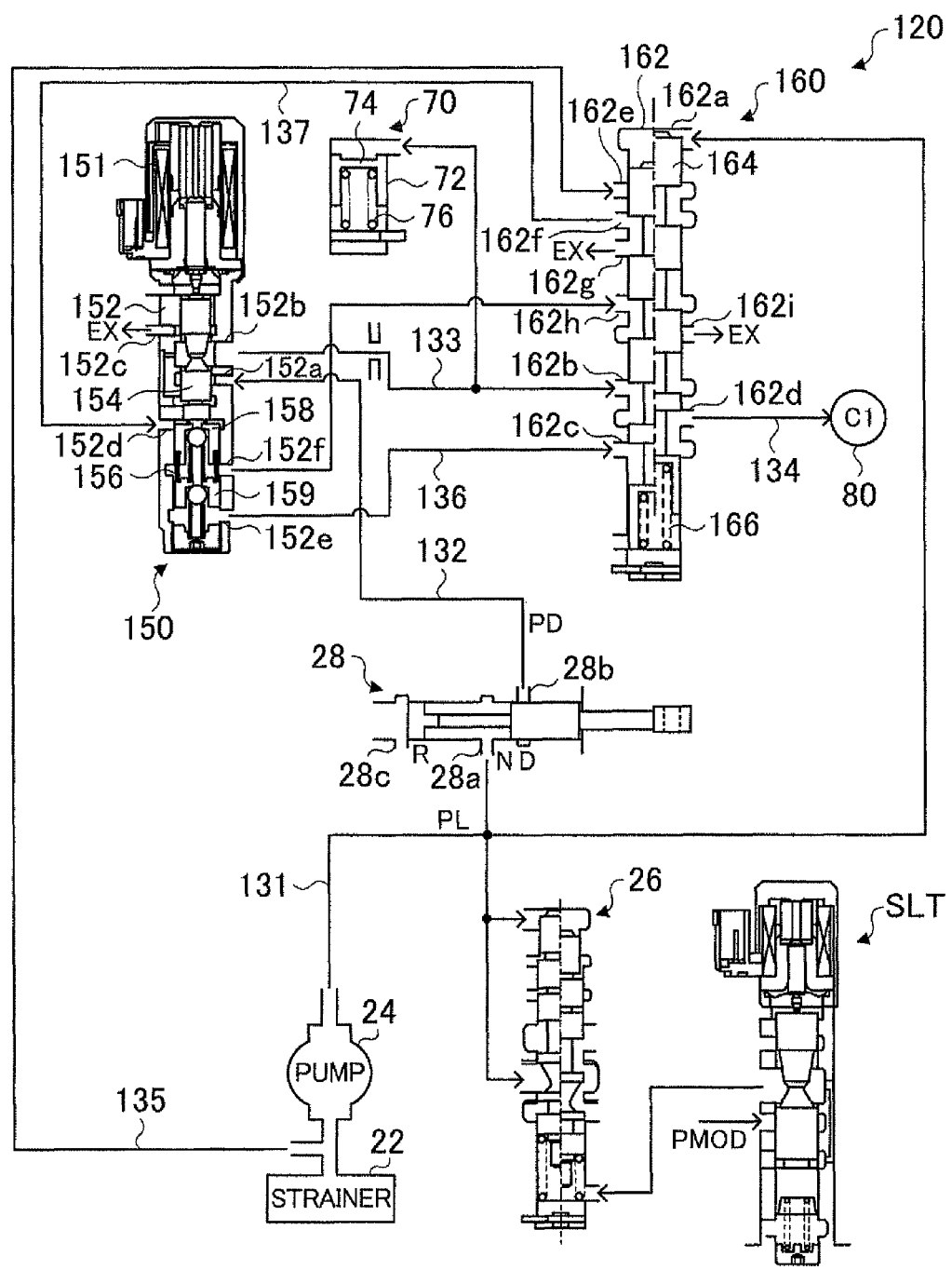
FIG. 3 is a diagram showing a schematic configuration of a fluid pressure control device 120 for an automatic transmission according to a modification.

In the fluid pressure control device 20 for an automatic transmission according to the embodiment, the electromagnetic pump 50 is formed as a single pump. However, the electromagnetic pump 50 may be formed integrally with a linear solenoid valve. FIG. 3 is a diagram showing a schematic configuration of a fluid pressure control device 120 for an automatic transmission according to a modification. As shown in the drawing, the fluid pressure control device 120 for an automatic transmission according to the modification includes, besides the mechanical oil pump 24, the regulator valve 26, the linear solenoid valve SLT, the manual valve 28, and the accumulator 70 discussed earlier, a linear solenoid valve 150 with a built-in pump that functions as the linear solenoid valve SLC1 and that functions also as the electromagnetic pump 50, and a switching valve 160 that selectively supplies to the clutch hydraulic pressure chamber 80 an output pressure obtained when the linear solenoid valve 150 functions as a linear solenoid valve and a discharge pressure obtained when the linear solenoid valve 150 functions as an electromagnetic pump.

The linear solenoid valve 150 includes: an electromagnetic portion 151 that generates an electromagnetic force along with energization of a coil; a hollow cylindrical sleeve 152 formed with an input port 152a, an output port 152b, a drain port 152c, a suction port 152d, a discharge port 152e, and a drain port 152f; a columnar spool 154 that slides in the sleeve 152 using the electromagnetic force from the electromagnetic portion 151 to establish and block communication between the predetermined ports; a spring 156 that urges the spool 154 in the direction opposite to the direction of the electromagnetic force of the electromagnetic portion 151; a suction check valve 158 provided integrally on an end surface of the spool 154 to be interposed between the spool 154 and the spring 156; and a discharge check valve 159 provided to support the spring 156 from the side opposite to the spool 154. By regulating the magnitude of a current to be applied to the coil of the electromagnetic portion 151 to adjust the opening degree of communication between the input port 152a and the output port 152b and the opening degree of communication between the output port 152b and the drain port 152c, the linear solenoid valve 150 functions as a linear solenoid valve that regulates the line pressure PL input from the input port 152a to output the regulated pressure from the output port 152b. Meanwhile, by intermittently energizing and de-energizing the coil of the electromagnetic portion 151 to use the sleeve 152 and the spool 154 as a cylinder and a piston, respectively, the linear solenoid valve 150 functions as an electromagnetic pump that sucks working oil from the suction port 152d to discharge the working oil from the discharge port 152e. The input port 152a of the linear solenoid valve 150 is connected to the D-position port 28b of the manual valve 28 via an input port oil passage 132. The output port 152b of the linear solenoid valve 150 is connected to an input port 162b of the switching valve 160 via an output port oil passage 133. The accumulator 70 which suppresses pulsation of the hydraulic pressure in the output port oil passage 133 is connected to the output port oil passage 133. The suction port 152d of the linear solenoid valve 150 is connected to a communication port 162f of the switching valve 160 via a suction port oil passage 137. The discharge port 152e of the linear solenoid valve 150 is connected to an input port 162c of the switching valve 160 via a discharge port oil passage 136. The drain port 152f of the linear solenoid valve 150 is connected to a drain input port 162h of the switching valve 160.

The switching valve 160 includes: a hollow cylindrical sleeve 162 formed with a signal pressure port 162a, the two input ports 162b and 162c, an output port 162d, a communication port 162e, the communication port 162f, a drain port 162g, the drain input port 162h, and a drain port 162i; a columnar spool 164 that slides in the sleeve 162 to establish and block communication between the predetermined ports; and a spring 166 that urges the spool 164. The signal pressure port 162a is a port to which a signal pressure that presses the spool 164 in the direction opposite to the urging direction of the spring 166 is introduced. The signal pressure port 162a is connected to a line pressure oil passage 131. The input port 162b is connected to the output port oil passage 133. The input port 162c is connected to the discharge port oil passage 136. The output port 162d is connected to the clutch hydraulic pressure chamber 80 via a clutch oil passage 134. The communication ports 162e and 162f are connected to a suction port oil passage 135 and the suction port oil passage 137, respectively. In the switching valve 160, when the line pressure PL is introduced to the signal pressure port 162a, the spool 164 is moved to a position indicated on the left half in the drawing to establish communication between the input port 162b and the output port 162d, block communication between the input port 162c and the output port 162d, block communication between the communication ports 162e and 162f, establish communication between the communication port 162f and the drain port 162g, and establish communication between the drain input port 162h and the drain port 162i. On the other hand, when the line pressure PL is not introduced to the signal pressure port 162a, the spool 164 is moved to a position indicated on the right half in the drawing to block communication between the input port 162b and the output port 162d, establish communication between the input port 162c and the output port 162d, establish communication between the communication ports 162e and 162f, block communication between the communication port 162f and the drain port 162g, and block communication between the drain input port 162h and the drain port 162i.

In the thus configured fluid pressure control device 120 for an automatic transmission according to the modification, when the engine is automatically stopped, the mechanical oil pump 24 is de-actuated, and the switching valve 160 blocks communication between the output port oil passage 133 and the clutch oil passage 134 and establishes communication between the discharge port oil passage 136 and the clutch oil passage 134. Thus, a hydraulic pressure can be applied to the clutch hydraulic pressure chamber 80 via the clutch oil passage 134 by causing the linear solenoid valve 150 to function as an electromagnetic pump to discharge working oil to the discharge port oil passage 136. After that, when the engine is automatically started, the mechanical oil pump 24 is actuated, and the switching valve 160 is driven by the line pressure PL to establish communication between the output port oil passage 133 and the clutch oil passage 134, block communication between the discharge port oil passage 136 and the clutch oil passage 134, and establish communication between the communication ports 162e and 162f. Thus, a hydraulic pressure can be applied to the clutch hydraulic pressure chamber 80 via the clutch oil passage 134 by causing the linear solenoid valve 150 to function as a linear solenoid valve to output working oil pumped from the mechanical oil pump 24 to the output port oil passage 133 via the linear solenoid valve 150.

Here, when the linear solenoid valve 150 is caused to function as an electromagnetic pump, the output port oil passage 133 to which the accumulator 70 is connected has been disconnected from the clutch oil passage 134 by the switching valve 160. Thus, the accumulator 70 is not connected to a path leading from the discharge port 152e to the clutch hydraulic pressure chamber 80 (the discharge port oil passage 136, the switching valve 160, and the clutch oil passage 134). Thus, the same effect as that achieved by the embodiment can be achieved. In the modification discussed above, the electromagnetic pump is formed integrally with the linear solenoid valve SLC1. However, the electromagnetic pump may be formed integrally with the linear solenoid valve SLT, or may be formed integrally with a linear solenoid valve other than the linear solenoid valves SLC1 and SLT.

Here, the correspondence between the main elements of the embodiment and the main elements of the invention described in the "SUMMARY OF THE INVENTION" section will be described. In the embodiment, the engine corresponds to the "motor". The clutch C1 corresponds to the "friction engagement element". The mechanical oil pump 24 corresponds to the "first pump". The linear solenoid valve SLC1 and the linear solenoid valve 150 correspond to the "pressure regulator". The output port oil passages 33 and 133 correspond to the "first flow passage". The clutch oil passages 34 and 134 correspond to the "second flow passage". The switching valves 60 and 160 correspond to the "switcher". The electromagnetic pump 50 and the linear solenoid valve 150 functioning as an electromagnetic pump correspond to the "second pump". The accumulator 70 corresponds to the "pressure accumulator". The discharge port oil passages 36 and 136 correspond to the "third flow passage". Here, the "pressure regulator" is not limited to a direct-control linear solenoid valve that generates an optimum clutch pressure from the line pressure PL to directly control a clutch. Rather, a linear solenoid may be used as a pilot-control linear solenoid to drive a separate control valve, which generates a clutch pressure to control a clutch. The "switcher" is not limited to a switcher actuated by the line pressure PL used as a signal pressure, and may be any switcher that switchably establishes and blocks connection between the first flow passage and the second flow passage, such as a switcher actuated by the modulator pressure used as a signal pressure or a switcher actuated by a signal pressure separately supplied from a solenoid valve. The "second pump" is not limited to an electromagnetic pump, and may be any pump actuated by supply of electric power such as a normal electric pump. The "switcher" is also not limited to the switching valve 60 interposed between the discharge port oil passage 36 from the electromagnetic pump 50 and the clutch oil passage 34, and may have any configuration that allows the working fluid to be supplied to the second flow passage when connection between the first flow passage and the second flow passage is blocked, such as a direct connection of the discharge port oil passage 36 to the clutch oil passage 34. The "pressure accumulator" is not limited to an accumulator that functions as a damper, and may be any type of pressure accumulator that has a pressure accumulation function. The correspondence between the main elements of the embodiment and the main elements of the invention described in the "SUMMARY OF THE INVENTION" section does not limit the elements of the invention described in the "SUMMARY OF THE INVENTION" section, because the embodiment is an example given for the purpose of specifically describing the best mode for carrying out the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and sprit of the present invention.

The present invention is applicable to the manufacturing industry of fluid pressure control devices for automatic transmissions.

What is claimed is:

1. A fluid pressure control device for an automatic transmission that transfers power from a motor via a friction engagement element, comprising:
    a first pump actuated by the power from the motor;
    a regulator valve that regulates a pressure of a working fluid pumped from the first pump;
    a linear solenoid valve that (i) receives the regulated working fluid by the regulator valve, (ii) further adjusts a pressure of the received regulated working fluid and (iii) outputs the adjusted working fluid to a fluid pressure chamber of the friction engagement element;
    a first flow passage connecting an output port of the linear solenoid valve and a switcher;
    a second flow passage connecting the switcher and the fluid pressure chamber of the friction engagement element;
    a second pump actuated by supply of electric power and capable of supplying the working fluid to the second flow passage, when connection between the first flow passage and the second flow passage is blocked by the switcher; and
    a pressure accumulator that accumulates the pressure of the working fluid, wherein
    the switcher switchably establishes and blocks connection between the first flow passage and the second flow passage, and
    an input passage to the accumulator is located within the first flow passage.

2. The fluid pressure control device for an automatic transmission according to claim 1, further comprising:
    a third flow passage connected to a discharge port of the second pump, wherein
    the switcher selectively switches connection between the first flow passage and the second flow passage and connection between the third flow passage and the second flow passage.

3. The fluid pressure control device for an automatic transmission according to claim 1, wherein:
    the switcher is a switching valve that switchably establishes and blocks connection between the flow passages along with sliding of a spool; and
    the pressure accumulator accumulates the pressure of the working fluid along with sliding of a piston, the pressure accumulator being formed to have a sliding surface diameter larger than that of the switcher.

4. The fluid pressure control device for an automatic transmission according to claim 1, wherein
    the second pump is an electromagnetic pump.

5. The fluid pressure control device for an automatic transmission according to claim 1, further comprising:
    an electromagnetic valve formed as a pressure regulation valve which includes a hollow sleeve formed with various ports including an input port and an output port, a spool that is moved in the sleeve to establish and block communication between the predetermined ports, and an electromagnetic portion that moves the spool using an electromagnetic force, the electromagnetic valve being configured to function also as a pump that pumps the working fluid by intermittently driving the electromagnetic portion with a part of the sleeve formed as a cylinder and with a part of the spool formed as a piston, wherein
the second pump is the electromagnetic valve.

* * * * *